2,886,438

EDIBLE UNSUBSTITUTED MONO ALKYL GLUCOSIDE-FATTY ACID ESTER COMPOSITIONS

George Barsky, New York, N.Y., and Vigen K. Babayan, Livingston, N.J., assignors to E. F. Drew & Co. Inc., New York, N.Y., a corporation of Delaware No Drawing. Application June 8, 1954
Serial No. 435,368

5 Claims. (Cl. 99—92)

The present invention is directed to edible compositions, more particularly to glyceride fats modified by certain materials which impart desirable properties to the fat.

There has been in use for a considerable number of years such compounds as mono and diglycerides of higher fatty acids which have been added in small amounts to edible fats in order to improve the characteristics thereof for certain uses. While such compounds were an improvement over the fat itself, they were not completely successful in view of which it has been desirable to incorporate substances in such fats which would impart better characteristics to the edible products. Among such substances are the sorbitan esters of higher fatty acids which have been used in fat compositions, but a question arises as to the toxicity thereof. Another type of substance which has been proposed consists of the alkoxy derivatives of partial esters of glucose and sorbitol. In such compounds the alkoxy radical consisted of a relatively long chain of alkoxy groups such as ethylene oxide and constituted the major portion of the molecule. Such compounds had limited utility and had been used in the making of bread in order to maintain the same soft texture over a substantial period of time. However, even for this limited purpose, this group of compounds was only partially effective.

In view of the deficiencies of prior compositions, it is among the objects of the present invention to provide a fatty composition containing a sufficient amount of a highly effective emulsifier which improves the properties of the fat and which is non-toxic.

It is also among the objects of the present invention to provide an emulsifier in combination with a fat which may be used as such for the usual edible purposes or which may be incorporated in various products and impart improved characteristics to a variety of such edible compositions.

It is further among the objects of the present invention to provide a composition which may be added to such foods as icings, baked products, frozen compositions and the like to impart desirable characteristics thereto.

In practicing the present invention an emulsifier is formed by the esterification of modified glucoside with a higher fatty acid. The glucoside used is a mono-ether having the following structural formula:

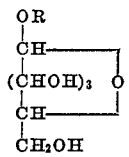

R represents an alkyl group having from 1 to 4 carbon atoms, thus including the methyl, ethyl and propyl radicals, and propylene and butylene glycol radicals.

The fatty acid used for esterification is one having from 6 to 22 carbon atoms, being characteristic of the fatty acids found in vegetable and animal oils and fats and having even numbers of carbon atoms. The relative molecular proportions of the alkyl glucoside and the fatty acid used in the esterification is in the ratio of about 1 to 1 to form the monoester of the alkyl glucoside. While the monoesters are contemplated, the diesters are also suitable and usually the monoesters contain varying amounts of diesters, triesters and unesterified substituted glucoside.

While single fatty acids may be used for esterification, such as stearic acid, it is not essential that pure or single acids be used. In most cases mixtures of fatty acids such as are on the market in commercial quantities give excellent results. Therefore, the present invention contemplates not only the esters of the single esters having 6 to 22 carbon atoms, but also mixtures of two or more of such acids. Preferably the fatty acids used have at least 12 carbon atoms.

The amount of the esters which is added to the fat may vary considerably but in all cases it is a minor proportion of the total composition. For instance, the use of 1.5% of the ester by weight of the fat has been found to give excellent results. However, considerable variation in the amount used is contemplated and generally the range is from .05 to 5.0% based on the weight of the fat. Larger amounts do not give sufficient improvement to warrant the use thereof under normal circumstances and the incorporation of less than the minimum amount does not ordinarily impart sufficient properties to the fat to give a highly desirable result.

There are numerous uses for the compositions of the present invention, as for example, the mixture of fat and ester may be used as such for shortening purposes in the same manner as fats not containing applicant's products are used. The improved shortening does not tend to scorch when used for frying and it avoids spattering when overheated.

The esters of the present invention may be incorporated in the hard butter currently on the market and which is used in various edible products, such as in candy, coatings and in icings for baked products. Coatings made with such a composition are glossy and stable over a relatively long period of time. As a result thereof, the edible goods retain their desirable appearance.

The shortening made in accordance with the present invention may be added to various mixes and batters, such as are ordinarily used in the making of bread and cake. Such baked products have been found to be light and fluffy. Applicants' compositions may be incorporated in ice cream, resulting in a smoothness and a uniformity which is an important factor in the appearance and in the taste of the ice cream.

In the preparation of the glucoside, a mixture of 1 mol of stearic acid and 1 mol of ethyl glucoside is placed in a reaction vessel with about 0.1% by weight of stearic acid of an oxide catalyst, such as calcium oxide or sodium hydroxide. Xylene is added as solvent, the mixture is agitated and heated to about 360°–370° F. for about six hours with slight sparging with $CO_2$. The heating is continued until the free fatty acid value has decreased below 5%. During the operation an azeotropic mixture of xylene and water is distilled off.

The mass is cooled and filtered at about 75°–80° F. The product is refined and bleached as is usual in the case of purification of esters.

In the above procedure the stearic acid may be replaced by other acids, such as oleic, lauric or others, or by mixtures of such acids, with good results. In place of the ethyl glucoside, equivalent substances may be used, such as any of the other glucosides named herein, under the conditions of operation set forth above.

The invention is more fully described in connection with the following examples of compositions wherein said glucoside esters are essential constituents:

Example 1

An ice cream composition containing 12% of butterfat and made in accordance with the present invention is as follows, the relative proportions being by weight:

| | Percent |
|---|---|
| 40% cream | 24.66 |
| 4% (butterfat) milk | 53.07 |
| Skim milk powder | 4.94 |
| Cane sugar | 12.00 |
| Corn syrup solids | 5.00 |
| Stabilizer | 0.33 |

The ingredients are incorporated into a uniform mass by the usual techniques of the industry and chilled. The composition contains in addition to water the following solids in the stated proportions by weight:

| | Percent |
|---|---|
| Butterfat | 12.00 |
| Milk solids not fat | 10.95 |
| Sugar | 17.00 |
| Stabilizer | 0.33 |

The stabilizer is a mixture of Irish moss and methylglucoside oleate in the proportions of 2 to 1.

Example 2

A chocolate coating composition is made up of the following ingredients:

| | |
|---|---|
| Cocoa powder (10–14% fat) | 4 lbs. 6 oz. |
| Non-fat milk solids | 3 lbs. 45 oz. |
| Hard butter | 7 lbs. |
| Lecithin | 0.8 oz. |
| Sugar | 9 lbs. 12 oz. |
| Salt | 0.5 oz. |
| Vanillin | 0.25 oz. |
| Ethylglucoside stearate | 2.0 oz. |

The total weight being 400 oz., the proposition of the ethylglucoside stearate emulsifier is 0.5%.

Example 3

In making a shortening, the base is a fat which is a hydrogenated vegetable oil of a standard consistency. To such a fat, in the heated state, is dispersed by the usual procedure 1.0% of ethylglucoside oleate. The resulting product is highly effective for such purposes as in frying various foods such as potato chips.

Example 4

A cake mix, in which the products of the present invention is incorporated, has the following composition in parts by weight:

| | |
|---|---|
| Cake flour | 312 |
| Shortening | 180 |
| Sugar | 348 |
| Baking powder | 8.75 |
| Salt | 10.5 |
| Skimmed milk | 248 |
| Egg white | 185 |
| Propylene glycolglucoside palmitate | 19 |

The cake when baked at 350° F. for about one and three quarters hours is quite light and fluffy.

Although several specific examples have been set forth above, the invention is not limited thereto as other edible compositions of the types described may be made in accordance with the invention. Also, any of the other glucosides described herein may be incorporated in the above examples and in the other edible compositions contemplated herein.

We claim:

1. An edible composition taken from the class consisting of chocolate mixes, ice cream mixes, shortening, and cake mixes consisting essentially of an edible glyceride fat having incorporated therein about .5 to 5.0% based on the weight of the fat of a fatty acid ester of an unsubstituted mono-alkyl-glucoside, the alkyl group having 1 to 4 carbon atoms, and the fatty acid having from 12 to 22 carbon atoms.

2. An edible composition taken from the class consisting of chocolate mixes, ice cream mixes, shortening, and cake mixes consisting essentially of an edible glyceride fat having incorporated therein about .5 to 5.0% based on the weight of the fat of a fatty acid ester of an unsubstituted mono-alkyl-glucoside, the alkyl group having 1 to 4 carbon atoms, and the fatty acid being taken from the class consisting of stearic, palmitic, lauric, myristic, oleic and linoleic.

3. An edible composition taken from the class consisting of chocolate mixes, ice cream mixes, shortening, and cake mixes consisting essentially of an edible glyceride fat having incorporated therein about .5 to 5.0% based on the weight of the fat of a fatty acid ester of an unsubstituted mono-alkyl-glucoside, the alkyl group having 1 to 4 carbon atoms, and the fatty acid having from 12 to 22 carbon atoms, there being present one fatty acid radical for each alkyl glucoside radical.

4. An edible composition taken from the class consisting of chocolate mixes, ice cream mixes, shortening, and cake mixes consisting essentially of an edible glyceride fat having incorporated therein about .5 to 5.0% based on the weight of the fat of a fatty acid ester of unsubstituted mono-methyl glucoside, the fatty acid having from 12 to 22 carbon atoms.

5. An edible composition taken from the class consisting of chocolate mixes, ice cream mixes, shortening, and cake mixes consisting essentially of an edible glyceride fat having incorporated therein about .5 to 5.0% based on the weight of the fat of a fatty acid ester of unsubstituted mono-ethyl glucoside, the fatty acid having from 12 to 22 carbon atoms.

References Cited in the file of this patent

UNITED STATES PATENTS

| 1,917,249 | Harris | July 11, 1933 |
|---|---|---|
| 1,917,254 | Harris | July 11, 1933 |
| 1,917,256 | Harris | July 11, 1933 |
| 1,917,257 | Harris | July 11, 1933 |
| 2,024,356 | Harris | Dec. 17, 1935 |
| 2,052,026 | Harris | Aug. 25, 1936 |

FOREIGN PATENTS

| 625,644 | Great Britain | July 1, 1949 |
|---|---|---|

OTHER REFERENCES

"Chemical Reviews," vol. 33 (1943), page 312.
"Carbohydrate Chemistry" by Pigman, copyright 1948, by Academic Press Inc., New York, pages 368–369.